Oct. 5, 1943.　　　R. S. WHALEY　　　2,331,064
METHOD OF AND APPARATUS FOR DISPENSING EFFERVESCENT LIQUIDS
Filed Nov. 30, 1940　　　7 Sheets-Sheet 1
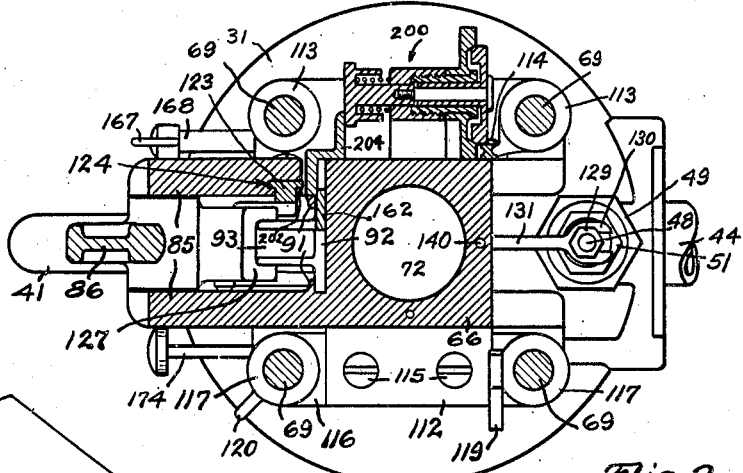
Fig. 2
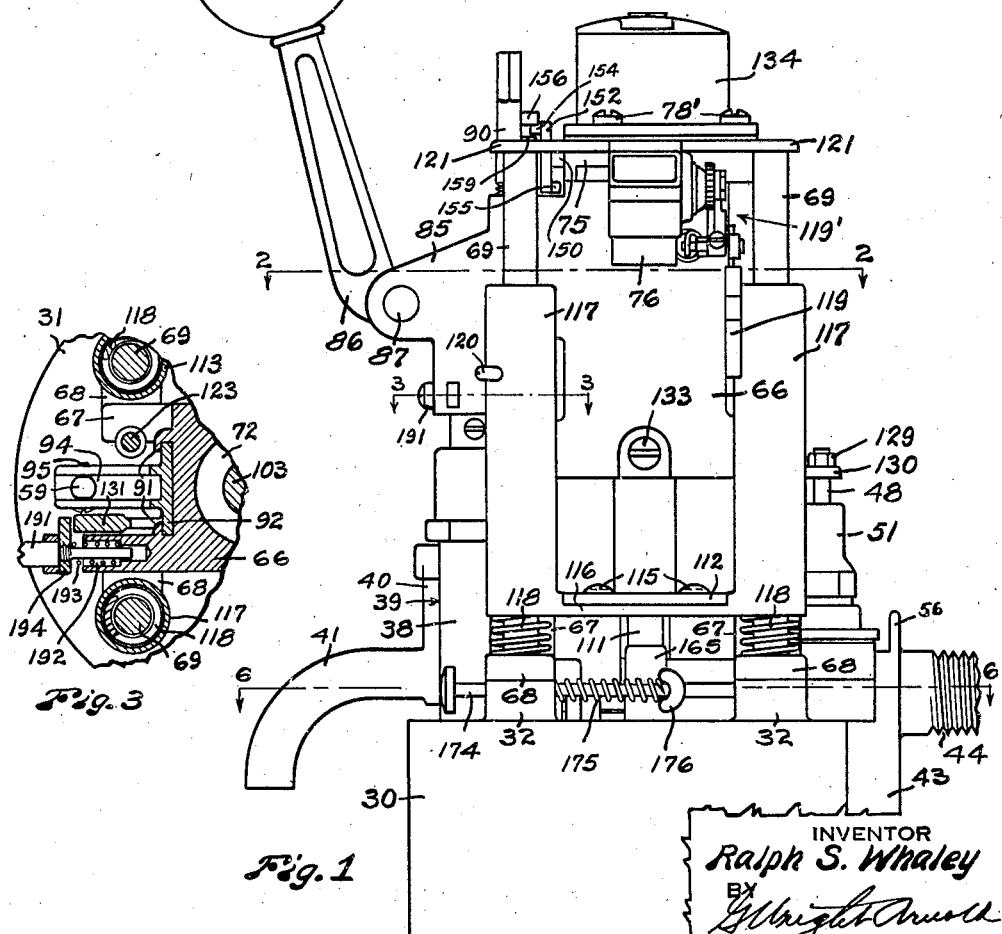
Fig. 3
Fig. 1
INVENTOR
Ralph S. Whaley
BY
ATTORNEY Oct. 5, 1943.    R. S. WHALEY    2,331,064
METHOD OF AND APPARATUS FOR DISPENSING EFFERVESCENT LIQUIDS
Filed Nov. 30, 1940    7 Sheets-Sheet 2

INVENTOR
Ralph S. Whaley
BY
ATTORNEY

Oct. 5, 1943.  R. S. WHALEY  2,331,064
METHOD OF AND APPARATUS FOR DISPENSING EFFERVESCENT LIQUIDS
Filed Nov. 30, 1940  7 Sheets-Sheet 3
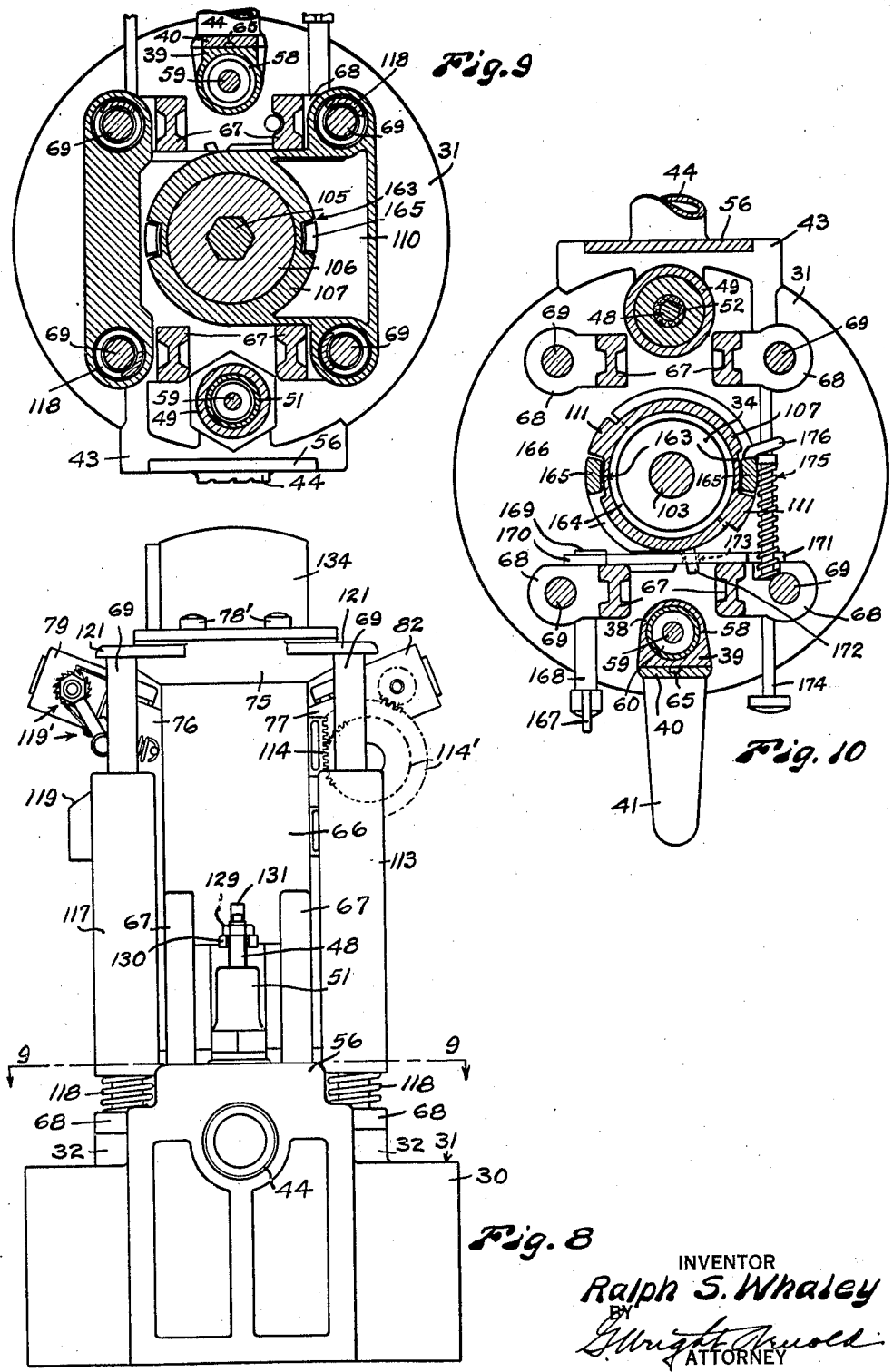
INVENTOR
Ralph S. Whaley
BY
ATTORNEY Oct. 5, 1943.                    R. S. WHALEY                    2,331,064
         METHOD OF AND APPARATUS FOR DISPENSING EFFERVESCENT LIQUIDS
                 Filed Nov. 30, 1940              7 Sheets-Sheet 4
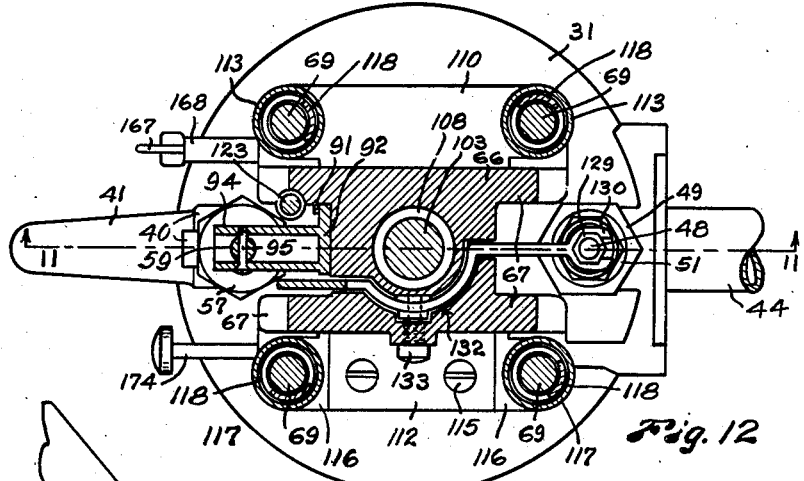
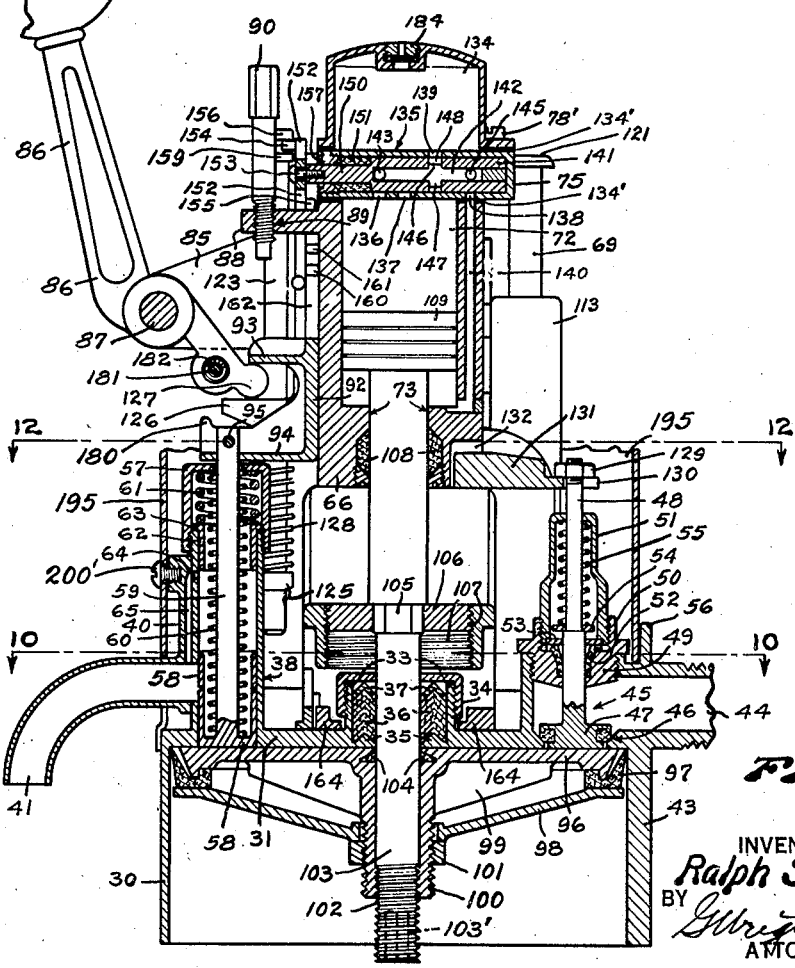
INVENTOR
*Ralph S. Whaley*
BY
ATTORNEY Oct. 5, 1943.  R. S. WHALEY  2,331,064
METHOD OF AND APPARATUS FOR DISPENSING EFFERVESCENT LIQUIDS
Filed Nov. 30, 1940  7 Sheets-Sheet 5
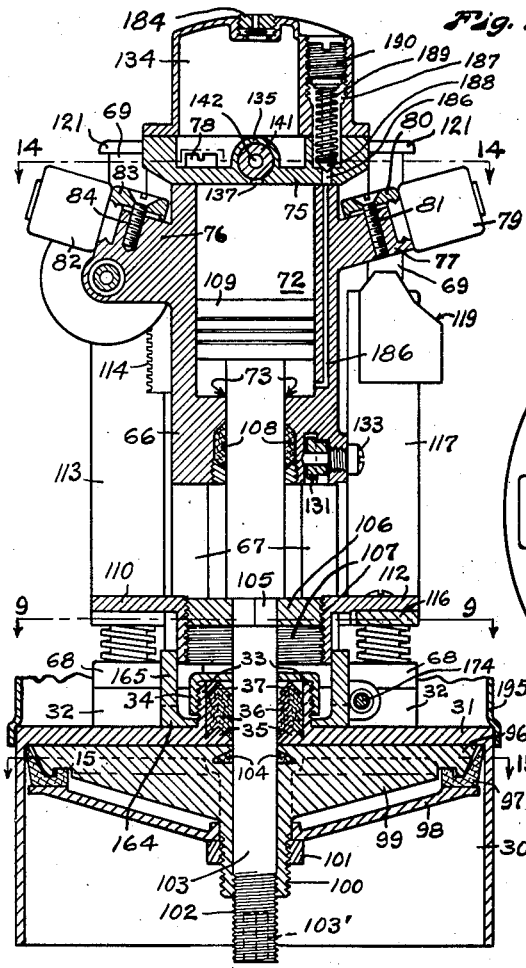
Fig. 13
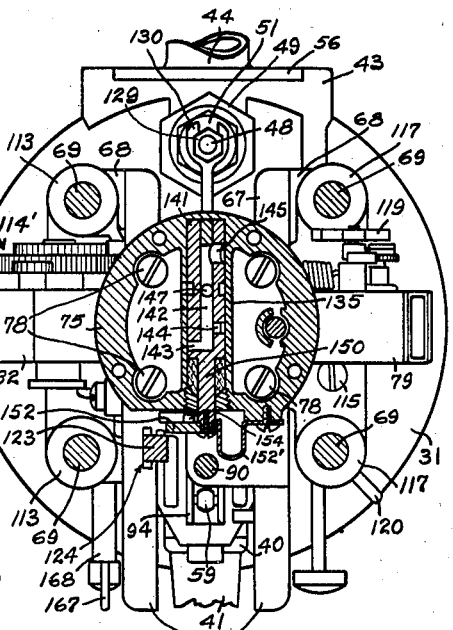
Fig. 14
Fig. 16
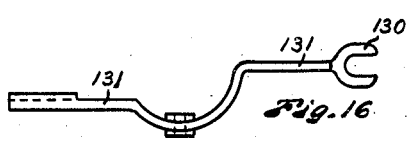
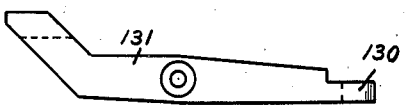
Fig. 17
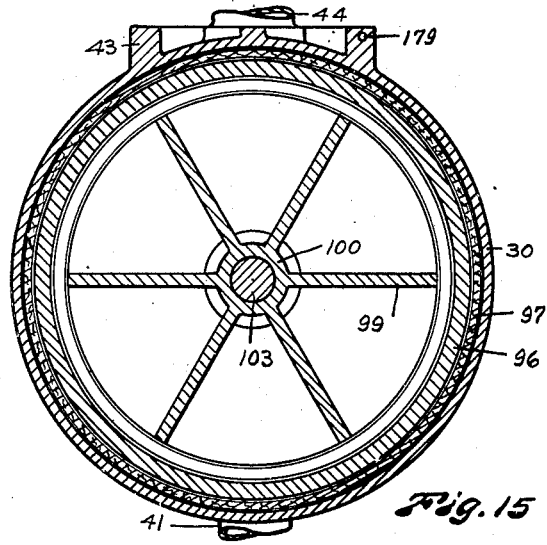
Fig. 15
INVENTOR
Ralph S. Whaley
BY
Wright Arnold
ATTORNEY

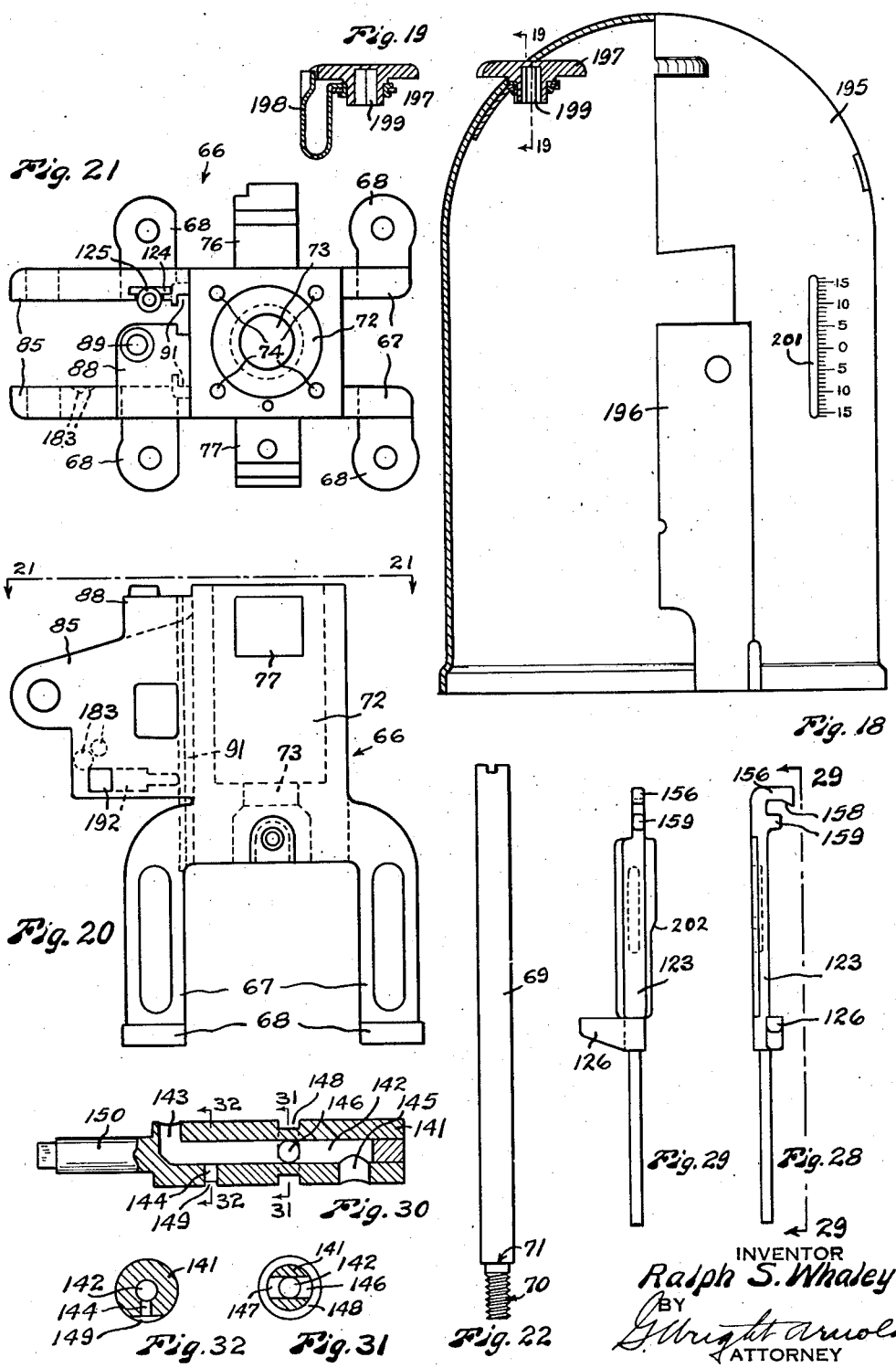

Oct. 5, 1943.   R. S. WHALEY   2,331,064
METHOD OF AND APPARATUS FOR DISPENSING EFFERVESCENT LIQUIDS
Filed Nov. 30, 1940   7 Sheets-Sheet 7
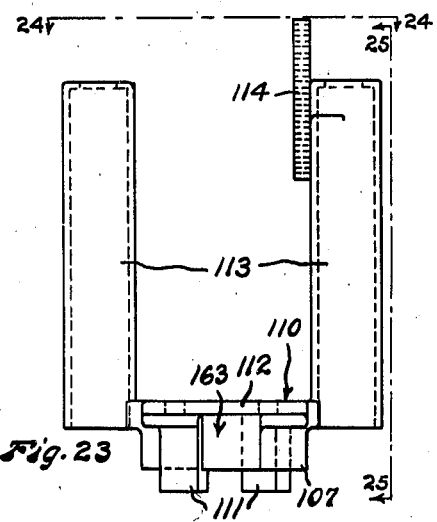
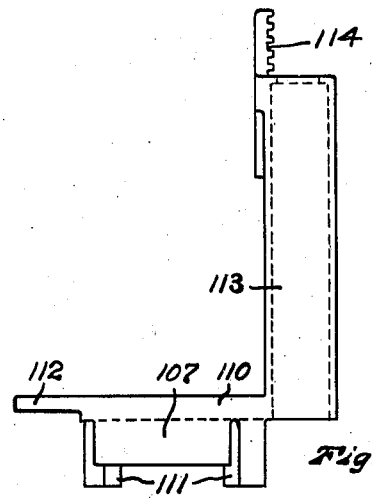
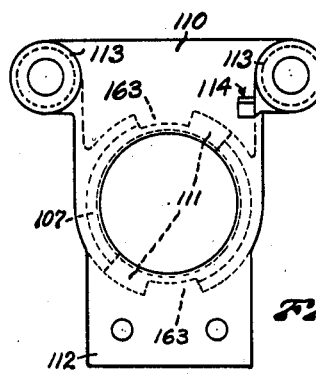
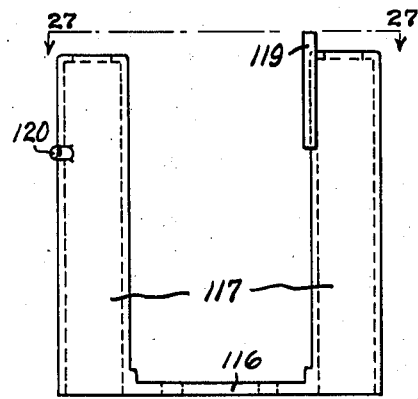
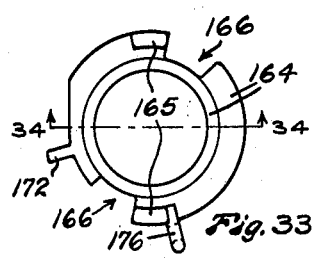
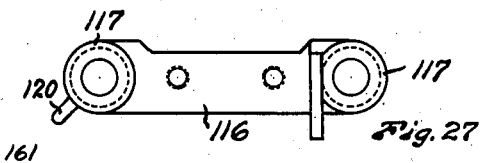
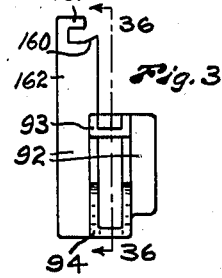
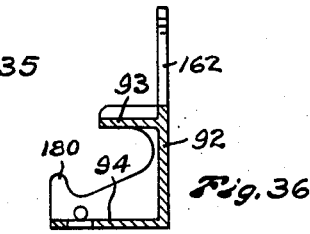
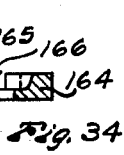
INVENTOR.
Ralph S. Whaley
BY
G. Wright Arnold
ATTORNEY Patented Oct. 5, 1943

2,331,064

UNITED STATES PATENT OFFICE 2,331,064

METHOD OF AND APPARATUS FOR DISPENSING EFFERVESCENT LIQUIDS

Ralph S. Whaley, Seattle, Wash.

Application November 30, 1940, Serial No. 368,024

13 Claims. (Cl. 225—9)

My invention relates to methods of and apparatus for dispensing effervescent liquids. Draft beer is an example of a commonly dispensed effervescent liquid to which this invention is applicable and my invention will be described in connection therewith by way of illustration and without limitation as to the scope of the invention.

The effervescent character of beer resides in the carbon dioxide included within the beer. This included carbon dioxide is the "life" of the beer and the proportionate loss of carbon dioxide from the beer means a proportionate decrease in the quality of the beer.

It has been known that the carbon dioxide content of the beer, which is normally developed during the brewing process, may be sufficiently retained in the beer if the beer is kept under sufficient pressure relative to the temperature of the beer. For example, in filling the kegs of beer at the brewery, the beer is sufficiently cooled, so that at atmospheric pressure desired quantities of carbon dioxide may be retained in the beer until the keg is closed. After the keg has been closed and is delivered from the brewery to the retailer, various temperatures may be encountered and the pressure within the keg will increase with temperature, so that ordinarily beer is delivered to the retailer at pressures from ten to thirty pounds per square inch and sometimes higher.

In dispensing the beer from kegs, it is undesirable to have the beer at a low enough temperature to retain the carbon dioxide content therein, as the beer will be too cold to be palatable. In other words, the temperature to retain the carbon dioxide within the beer will be slightly above the freezing point, whereas the desired serving temperature of beer is approximately 43° to 47° Fahrenheit.

The prior commercial practice of serving beer has been therefore to reduce the pressure within the keg so that the beer may be served with the desired quantity of foam, or to transform the pressure between the keg and the dispensing spout by means of surface friction. Referring first to the practice of reducing the pressure in the keg and dispensing the beer from a keg having such reduced pressure, the carbon dioxide escapes from the beer and the beer gradually becomes "flat" in the keg and unpalatable. Under this system of dispensing beer, the practice has been to use relatively small kegs and attempt to use the entire contents within a period of hours after the pressure has been reduced, to "get by." However the quality of the beer has decreased proportionately to the time the keg has been tapped. Referring to the second prior art commercial method of transforming the pressure into friction, so that the pressure at the dispensing spout was sufficiently small so that the foam of the beer could be controlled, a number of difficulties are inherent in such systems. First, beer is a liquid containing a large percentage of solids. These solids tend to deposit on the surface area of small passageways necessary to cause the friction and in turn reduce the pressure. These deposits on such surfaces become hardened and are very difficult to remove to clean and sterilize the beer passageways. Also, where the pressure is reduced at the beer dispensing spout by friction, the amount of friction necessary will vary with the pressure and carbon dioxide content of the beer and the temperature of the beer. Also, where the pressure is reduced by friction, when the beer is static the keg pressure will be present at all parts of the tubing until there is a movement of the beer, so that the friction may consume part of the keg pressure. This results in an initial spurt before friction has had an opportunity to act to reduce the pressure. Also, such systems have a tendency to work the carbon dioxide from the surface of the beer, so that the carbon dioxide escapes as the beer is being drawn into the glass.

It is important to note that in both types of prior art commercial devices the carbon dioxide content of the beer is reduced and the quality of the beer thus proportionately diminished. A further difficulty in the prior art commercial practices resides in the great loss of beer because of excessive foaming when the keg is first tapped, or the excess beer delivered to the customer when the last portions of a keg are being dispensed. In other words, to draw the first portion of the keg the bar tender would draw more than the desired number of fluid ounces because of scraping off the excess in the nature of the foam and replacing the same with liquid beer, and during the later part of the keg the bar tender would draw excess beer (although of lesser quality), as the proper amount of foam was not present on the top of the glass. The loss of beer in the dispensing operation for the reasons above mentioned has often been conceded as ten to twenty percent. In other words, if the retailer attempts to serve a predetermined number of fluid ounces in each glass, as sixteen fluid ounces, from a given number of fluid ounces purchased, he will only be able to serve eighty to ninety percent of the glasses which mathematically he should be able to obtain from the beer which he has purchased.

It is an object of this invention to provide a method of drawing beer that will permit the maintaining of a sufficient pressure in the keg to maintain the original carbon dioxide content of the beer within the beer, regardless of whether the keg is full or partly full. In this connection the usual air or gas pressure systems to provide desired pressures in the keg may be employed.

It is a further object of this invention to deliver liquid beer from the keg at the desired keg pressure into a measuring device in the nature of a cylinder and a traveling piston maintained therein, wherein the travel of the piston is adjusted to provide a chamber (between the piston and the cylinder), having the desired fluid ounce content.

It is a further object to provide stop means movable into and out of engagement with means carried by the traveling piston, to provide for selective full travel of the piston or intermediate travel of the piston, so as to provide a chamber having the desired fluid ounce content and selectively a chamber having a lesser fluid ounce content. It is a further object of the invention to provide adjusting means which simultaneously and proportionately adjust both chambers, that is, for the full size or the lesser size.

It is a further object to provide a traveling piston which is urged in one direction by the incoming beer under pressure and which movement serves to tension spring means, which serve to provide the motive force for the return stroke of the piston. It is an object to provide fluid controlled dampening means to regulate the speed of travel of the piston in either direction.

It is a further object of the invention to provide valve inlet means to the measuring chamber which are mechanically linked with valve outlet means in the measuring chamber, to insure closing of the valve inlet means before opening of the valve outlet means.

It is a further object of the invention to provide means which will serve to first close the inlet valve and then enlarge the measuring chamber to relieve the pressure, provide for expansion and settling of the beer before opening the outlet means from the measuring chamber.

It is a further object of the invention to provide a combination means for enlarging the measuring chamber and also functioning as a valve outlet means.

It is a further object of the invention to provide lever means connected with the measuring chamber valve inlet means, the means for expanding the measuring chamber, the chamber valve outlet means, and the fluid controlled dampening means, so that an operator by operation of one lever may practice my method of dispensing beer.

It is a further object of this invention to provide a method of dispensing beer whereby the beer at a predetermined pressure urges a regulated and dampened traveling wall of a measuring chamber against a stop to measure a quantity of liquid beer under a pressure sufficient to retain the carbon dioxide within the beer, thereafter to seal the beer within the measuring chamber from the source of beer, then to enlarge the measuring chamber to permit release of pressure and expansion of the beer, exposing the beer to atmospheric conditions, and then at a regulated rate of discharge urging the beer out of the measuring cylinder into a desired receptacle, as a glass.

It is a further object of the invention to provide a beer discharge nozzle which is characterized by being sealed, except for the delivery opening, from the atmosphere in response to movement of the operating handle in one direction to provide the desired character of flow during the main discharge operation, and which nozzle is vented to the atmosphere by movement of the operating lever in the other direction to drain any beer tending to be retained in the nozzle by atmospheric pressure to completely discharge the nozzle during each operation.

It is a further object to provide a device which is rapid in operation, to increase the number of glasses which may be drawn in a given period; for example, fourteen glasses of beer have been accurately and properly drawn from devices embodying my invention by the same operator, who, while proficient in the use of commonly used prior art commercial devices, was able to reasonably properly draw only eight glasses per minute from such prior art devices.

It is a further object of the invention to provide release mechanism between the interlocked linkage provided between the inlet valve and the outlet valve from the beer measuring chamber, so that temporarily for cleaning purposes both the said inlet and outlet valves may be arranged in open position.

It is a further object of the invention to provide an operating lever which is similar in movement of direction to the operating lever now commonly used by and familiar to bar tenders, which lever in my device on its upward movement opens the inlet valve providing for delivery of beer under pressure to the measuring chamber. The operating lever is held in this position until the measuring cylinder is full, which may be indicated either visibly or audibly or both. Then the angular direction of the lever is reversed, and upon the first portion of the stroke of the lever, which is preferably indicated by contacting additional resilient pressure means, provides for first closing the inlet valve means to the then full measuring cylinder, moves means for first enlarging the capacity of the measuring chamber to provide for release of pressure and expansion of the then static beer, and then releases the measuring chamber to the atmosphere, so that the beer from the measuring cylinder may be delivered therefrom out through spout means to a container. Thereafter, upon further movement of the lever in this latter direction, fluid pressure control means are utilized for regulating the delivery of beer from the measuring chamber, and the rate of discharge is subject to control in speed by the further extent of movement of the lever in this latter direction.

It is a further object of the invention to provide adjustable regulating means, as a screw or cam, to provide for predetermined maximum movement of the lever in the latter direction, so as to limit the maximum discharge rate of beer from the measuring chamber and thereby serve as a foam control means.

The above mentioned general objects of my invention, together with others inherent in the same, are attained by the device illustrated in the following drawings, the same being a preferred exemplary form of embodiment of my invention, throughout which drawings like reference numerals indicate like parts:

Figure 1 is a side elevation, with parts broken away, of a beer dispensing device constructed in accordance with this invention;

Fig. 2 is a cross sectional view taken substantially on broken line 2—2 of Fig. 1, parts being shown in plan and other parts being broken away;

Fig. 3 is a fragmentary sectional view taken substantially on broken line 3—3 of Fig. 1, showing parts of a cleaning lock means for a lever;

Fig. 8 is a rear elevation of this beer dispensing device;

Fig. 9 is a cross sectional view taken substantially on broken line 9—9 of Fig. 8, parts being shown in plan and other parts being broken away;

Fig. 10 is a sectional view taken substantially on broken line 10—10 of Fig. 11, parts being shown in plan and other parts being broken away;

Fig. 11 is a vertical mid-sectional view taken substantially on broken line 11—11 of Fig. 12, parts being shown in elevation and other parts being broken away;

Fig. 12 is a cross sectional view taken substantially on broken line 12—12 of Fig. 11, parts being shown in plan and other parts being broken away;

Fig. 13 is a vertical mid-sectional view taken substantially on broken line 13—13 of Fig. 5, parts being shown in elevation;

Fig. 14 is a cross sectional view taken substantially on broken line 14—14 of Fig. 13, parts being shown in plan and other parts being broken away and the handle being omitted;

Fig. 15 is a cross sectional view taken substantially on broken line 15—15 of Fig. 13, parts being broken away and other parts being shown in plan;

Fig. 16 is a detached plan view of an inlet valve lever embodied in the invention;

Fig. 17 is a detached elevation of said inlet valve lever;

Fig. 18 is a detached view of a cover or housing for this device showing one half thereof in front elevation and the other half in vertical section;

Fig. 19 is a detached sectional view, taken on line 19—19 of Fig. 18, and showing a button or knob for foam control means;

Fig. 20 is a detached side elevation of a main frame and oil cylinder member;

Fig. 21 is a detached plan view taken on broken line 21—21 of Fig. 20, and showing said main frame and oil cylinder member;

Fig. 22 is a detached elevation of a hold down screw and post for the main frame;

Fig. 23 is a detached elevation of a spring frame and guide member;

Fig. 24 is a detached top plan view, taken on broken line 24—24 of Fig. 23, of said spring frame and guide member;

Fig. 25 is a detached elevation, taken on broken line 25—25 of Fig. 23, of said spring frame and guide member;

Fig. 26 is a detached elevation of a detachable spring frame and guide member;

Fig. 27 is a top plan view, taken on broken line 27—27 of Fig. 26, of said detachable spring frame and guide member;

Fig. 28 is a detached elevation of a fill pressure control toggle member;

Fig. 29 is a detached elevation of said fill pressure control member looking in the direction of broken line 29—29 of Fig. 28;

Fig. 30 is a detached view in longitudinal section of a foam and fill control rotor or valve member, the same being shown on a larger scale than the other views;

Figs. 31 and 32 are views in cross section of said rotor, taken substantially on broken lines 31—31 and 32—32 of Fig. 30 respectively;

Fig. 33 is a detached plan view of a stop ring;

Fig. 34 is a sectional view with parts in elevation of said stop ring, taken substantially on broken line 34—34 of Fig. 33;

Fig. 35 is a detached front elevation of an operating cross head member; and

Fig. 36 is a sectional view of said cross head member, taken substantially on broken line 36—36 of Fig. 35, parts being shown in elevation.

Preferably all threads of all parts of this device where there is any possibility of leakage are close fitted and all parts are made non-corrosive as by making them of stainless steel or plating with chromium or tin or the like where necessary or desirable for finishing purposes or to make them non-corrosive to the beer with which they come in contact.

In Figs. 1 to 15 incl. the several parts of the device are shown as they will appear if the main piston in the lower large cylinder is adjusted as far upwardly as it will go on the threads of the piston rod on which it is mounted. This position is for the minimum amount which the device can be set to draw for a "full" glass as hereinafter described.

Figure 4:
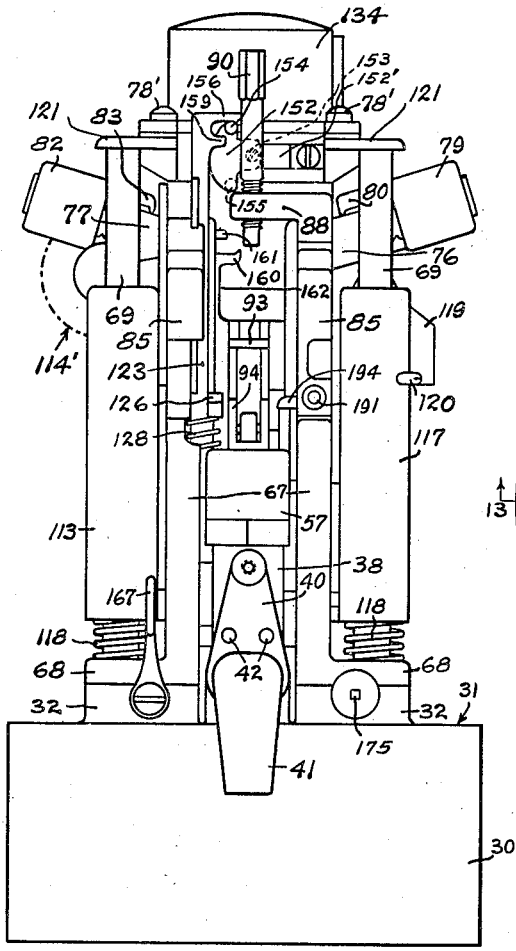
Fig. 4 is a front elevation of this beer dispensing device, the handle being removed.
Figure 6:
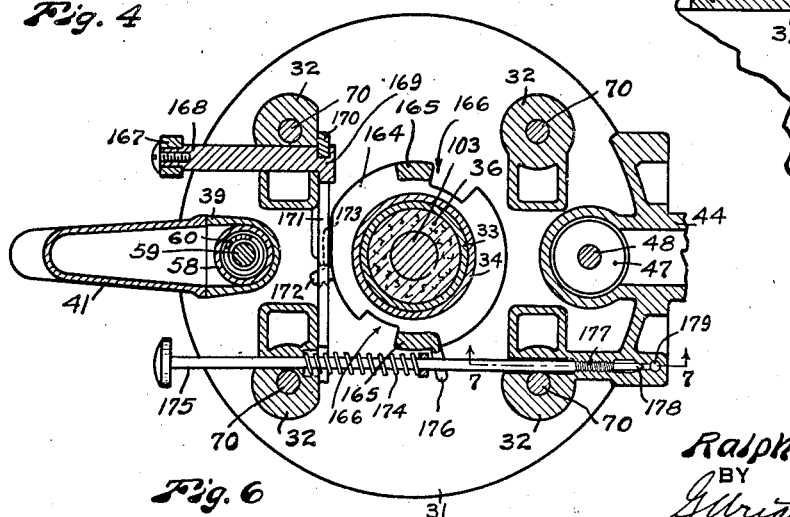
Fig. 6 is a cross sectional view taken substantially on broken line 6—6 of Fig. 1, parts being shown in plan and other parts being broken away.

Referring to the drawings, 30 designates a main cylinder which may be open at the bottom and has a head 31 at the top end. Preferably this main cylinder is chrome plated and polished both inside and outside. Four bosses 32, best shown in Figs. 6, 4 and 13, are provided on the top side of the head 31 in symmetrically spaced relation to facilitate the attachment to the main cylinder of certain parts and to serve as guide means for certain other parts, as hereinafter explained. The head 31 of the main cylinder has a centrally positioned upwardly extending integral tubular boss 33, see Figs. 11 and 13, that is externally threaded for the reception of a cap 34. Within the boss 33 is a centrally positioned opening which is co-axial with a centrally positioned opening in the head 31 of smaller diameter than the interior of the boss. A packing seat 35 having a cross sectional shape like a flattened inverted letter V is provided within the bottom portion of the tubular boss 33. This seat 35 is adapted to receive a form of packing 36 commonly known as "chevron" packing. A metal cap 37 rests on the top of the packing 36 and the screw cap 34 engages with this metal cap 37 to compress the packing 36. This construction comprises one practical manner of providing a sliding liquid tight seal between the piston rod 103 and the head 31.

An upright integral tubular discharge valve cylinder 38, see Fig. 11, is provided on the head 31 of the main cylinder 30 adjacent the front side thereof—for purposes of description herein, the side of this device from which liquid is drawn off is herein referred to as the front and the opposite side is herein referred to as the rear of this device. An integral metal pad member 39, see Fig. 10, is provided externally on the front side of the upright valve chamber 38 and is adapted to have the base or back portion 40 of a downwardly curved tubular discharge nozzle 41 secured thereto. Preferably the base portion 40 of this nozzle is sweated to the pad member 39. Dowel pins 42 preferably are provided on the pad 39 to insure proper positioning of the nozzle member. Preferably nozzle member 40—41 is chrome plated and polished externally and tin plated internally.

At the rear side, the main cylinder 30 is provided with a reinforced or ribbed wall portion 43 with which an externally threaded horizontal tubular inlet conduit 44 is integrally connected at a location above the plane of the head 31 of the cylinder. An upright tubular inlet valve chamber 45, see Fig. 11, is formed integral with the head 31 and inlet conduit 44 and communicates with the inlet conduit 44, as shown in Figs. 6 and 11. A valve seat 46 is provided in the wall 31 at the bottom of the valve chamber 45. A vertically movable inlet valve 47, see Fig. 11, on a stem 48 cooperates with the valve seat 46 to control the inlet of liquid from the tubular liquid inlet member 44 to the interior of the main cylinder 30. The inlet valve 47 is thus arranged so that liquid or beer under pressure tends to hold valve 47 on its seat 46.

The tubular boss that cooperates in forming the valve chamber 45 is internally threaded for the reception of a plug type cap 49 through which the valve stem 48 is guided for sliding movement. The cap 49 has an upwardly extending internally threaded boss 50 for the reception of the externally threaded lower end portion of a relatively long tubular spring housing 51. A packing member 52 is provided in the cap 49 around the valve stem 48 and a washer 53 on said packing is held in position by the spring housing 51 and clamps the packing to prevent leakage about the stem 48. Within the spring housing 51 the valve stem 48 has a shoulder whereon a washer 54 rests. A compression spring 55 is interposed between the washer 54 and the top of the spring housing 51 for yieldingly urging the valve 47 into a closed position. Liquid under pressure in inlet conduit 44 will also tend to hold the valve 47 closed.

A flange member 56 extends upwardly from the inlet conduit 44, as shown in Figs. 1, 2, 8, 11, 12 and 14. Said flange member 56 and said ribbed portion 43 are mounted against one side of a suitable vertical support (not shown), the inlet member 44 extends therethrough to a source of effervescent liquid to be dispensed (not shown), and nut means (not shown) threadedly engage inlet conduit 44 and the other side of the vertical support.

The discharge valve cylinder 38, see Fig. 11, is externally threaded at its upper end for the reception of an internally threaded cap 57. A discharge valve 58 of piston type, preferably chrome plated and polished, is closely fitted within the cylinder 38 and is provided with a valve stem 59 that extends upwardly through the cylinder 38 and out through the cap 57. A relatively long compression spring 60 is provided on the valve stem 59 between the discharge valve 58 and the cap 57 to yieldingly urge the discharge valve 58 into a closed position. I provide a relatively strong heavy compression spring 61 interposed between the top end portion of the cap 57 and a tubular spring retainer member 62. The member 62 is slidable within the discharge valve cylinder 38 and has a shoulder 63 that engages with the top edge portion of said cylinder 38. When the discharge valve 58 engages the spring retainer 62, the spring 61 acts as an additional load on the handle 86 so that an operator will know that the valve 58 is open, that beer in the measuring chamber is being vented to the atmosphere, and that beer may be caused to be discharged upon further movement of the handle 86. Further movement of the handle 86 and compression of the spring 61 will cause rotary movement of hydraulic control valve means shown in detail in Figs. 30 to 32 and will provide for regulation of the discharge of beer from the measuring chamber (as hereinafter explained). Also the operator may control the extent of foam from the operating handle 86 depending upon the extent of depression of spring 61.

A small opening 64, Fig. 11, is provided in the wall of the cylinder 38 just below the lower end portion of the spring retainer 62 and in communication with a groove 65 in the portion 40 of the nozzle 41, which groove 65 communicates with the interior of the discharge nozzle 41. Valve 58 covers this opening 64 during the main discharge period as the said valve 58 is then raised. After the valve 58 is lowered into the position shown in Fig. 11, air will be admitted to the nozzle 41 by way of opening 64 and groove 65 to facilitate drainage of beer from the nozzle 41. Thus the nozzle 41 at the finish of the main discharge has an opening to the atmosphere at its highest point to discharge beer which is held in the nozzle by atmospheric pressure. Also during the main discharge there is no opening to the atmosphere except the discharge opening so the desired character of flow is provided. The venting of the nozzle 41 to the atmosphere is provided only after the direction of lever 86 is reversed so that upon each operation the nozzle will be completely drained.

A main frame member 66, shown detached in Figs. 20 and 21 and shown in Figs. 1, 2, 4, 8, 11 and 13, is adapted to be mounted on the head 31 of the main cylinder 30. This main frame 66 comprises four upright supports 67, each having a foot portion 68 thereon that is adapted to rest on one of the bosses 32 on the head 31. Four hold down screws 69, which also serve as upright spring frame guides, are used to secure the main frame 66 to the cylinder head 31. Each hold down screw 69, shown detached in Fig. 22, has a threaded lower end portion 70, of smaller diameter than the remainder of the screw, that is adapted to screw into a suitable hole in one of the bosses 32 and that forms a shoulder 71 adapted to engage with and clamp the foot portion 68 through which the screw extends to the bosses 32.

An oil cylinder 72 is provided within the upper portion of the main frame, see Figs. 11, 13, 20 and 21, and a centrally positioned opening 73 is provided in the bottom portion of this oil cylinder 72. Preferably the exterior of the oil cylinder portion of this main frame is square, see Fig. 21, and is provided with threaded holes 74 for the reception of screws 78, Figs. 13 and 14, by which an oil cylinder head 75 is secured thereto. The function of the oil cylinder 72 and parts connected therewith is to provide for regulated rate of travel of the piston in either direction and adjustable travel on its discharging travel.

Two integral brackets 76 and 77 are cast on opposite sides of the main frame 66 near the upper end portion thereof, see Figs. 13, 20 and 21. A glass counter or tally device 79 for recording the number of upward movements of the piston 96 is secured to the bracket 77, see Fig. 13, by a clamp 80 and screw 81 and another recording device 82 for recording the liquid volume dispensed is secured to the bracket 76 by a clamp 83 and screw 84. Also the bracket 76 serves as a support for a clutch mechanism 200 for engaging recording device 82 with the rack 114 and gearing 114' during one direction of travel and releasing the said parts during the other direction of travel, as hereinafter explained.

Two spaced apart bracket members 85 (see Figs. 14 and 21), are provided on the front side of the main frame member 66 for the reception therebetween of an operating handle or lever 86, Figs. 1 and 11, that is pivoted on a transverse pin member 87. The lever 86 is hereinafter more fully described.

Another bracket 88, Figs. 11 and 21, is provided on frame member 66 between the bracket members 85 and a threaded hole 89 is provided in the bracket 88 for the reception of an adjustable stop, as adjusting screw 90, which functions as a foam control as hereinafter described. A vertical guideway 91, see Figs. 3, 11, 12 and 21, is provided for slidably receiving the base portion 92 of an operating cross head, Figs. 11, 35 and 36. This cross head has an outwardly protruding lug 93 for engagement by the rounded member 127 of the lever 86 and also has an outwardly protruding bracket portion 94 connected by a pin 95 with the stem 59 of the discharge valve 58, see Fig. 11.

Operatively disposed within the main cylinder 30 is a main piston comprising an upper metal piston member 96, a cup shaped piston ring 97 and a metal piston ring clamp 98. The piston ring 97 is of suitable packing material having some flexibility and is securely held between the piston member 96 and the piston ring clamp 98.

The main piston member 96 is of slightly smaller diameter than the main cylinder and has a flat upper surface adapted to come in contact with the head 31 of the cylinder 30 when there is no liquid in the cylinder 30. A plurality of ribs 99 are provided on the bottom side of the main piston member and the plane of section in Fig. 13 is longitudinally through two of these ribs. Fig. 15 also shows these ribs in section.

The main piston member 96 also has a downwardly protruding tubular boss 100 provided near its lower end with external threads for the reception of a nut 101 by which the piston ring clamp 98 is secured in clamped engagement with the cup ring 97. Also the tubular boss 100 is internally threaded for cooperation with an externally threaded portion 102 of a piston rod 103. A packing member 104 is provided within the piston 96 adjacent the upper face thereof and around the piston rod 103. The piston ring 97 fits snugly within the cylinder 30 and helps to prevent the main piston assembly from turning within said cylinder and it will be obvious that when the piston rod 103 is rotated relative to the piston 96, longitudinal movement will be provided between the piston 96 and the piston rod 103 and parts connected therewith.

The piston rod 103, Figs. 11 and 13, has a non-circular portion, such as hexagonal portion 105 provided thereon. This non-circular portion 105 is seated within an externally threaded disc shaped volume adjusting member 106 that is threaded into a tubular socket 107 which is integral with a base portion 110 of a spring frame and guide member, shown detached in Figs. 23, 24 and 25. Obviously rotation of piston rod 103 will move the disc member 106 longitudinally within the socket 107 and this will provide for adjustment of the volume delivered at each operation of the main piston for a half portion or five cent glass, as hereinafter explained, and will also adjust the full portion or ten cent glass by providing longitudinal movement between the rod 103 and the piston 96.

Above the hexagonal portion 105 the piston rod 103 is of larger size and is circular and has a shoulder resting on the disc 106. Also the piston rod 103 extends through a packing member 108, see Fig. 11, that is provided in the bottom wall of the oil cylinder 72. Within the oil cylinder 72 the piston rod 103 is provided with a rigidly connected piston 109. Movement of the piston 109 is controlled by oil within the oil cylinder 72 and this controls the speed of movement and timing of the main piston assembly in the main cylinder 30 during operation. More particularly, the operation of the oil cylinder 72 serves to control the speed of travel of the piston 96 and the inlet and discharge of beer from the measuring cylinder 30.

The spring frame and guide member shown detached in Figs. 23, 24 and 25 and also shown in Figs. 1, 11, 12 and 13, comprises the base portion 110, the downwardly extending socket 107, two diametrically opposite lugs 111 extending below the socket 107, a shelf like plate portion 112 extending outwardly from one side of the socket 107 and two tubular upright spaced apart spring guides 113 positioned at the side of the socket 107 opposite the plate member 112 and adapted to fit over two of the upright hold down screws or posts 69. An upright gear rack 114 is rigidly connected with one of the tubular spring guides 113. A detachable spring frame, Figs. 26 and 27, is secured by screws 115, Figs. 1 and 2, to the shelf 112. This detachable spring frame comprises a base 116 and two upright spaced apart tubular spring guides 117. A compression spring 118 is provided within each of the spring guides 113 and 117 with its upper end abutting against the top of the spring guide and its lower end resting on one of the foot members 68 of the main frame 66, see Figs. 1 and 8. These springs exert an upward pressure on the spring frame and guide members urging the main piston assembly in the cylinder 30 in an upward direction at all times. When the two spring frame members are secured together by the screws 115 they become rigid with each other and operate as a unit. A cam 119 is provided on one of the spring guides 117, see Fig. 26, for operating the indicator 79 to count the number of upward movements of piston 96 and thereby count the number of glasses, see Fig. 13. A lug 120 (Fig. 1) is provided on the other spring guide 117 to act as an indicating pin visible through the slot 201, see Fig. 18, in cover 195 indexing with figures stamped on the cover to show the volume at which the main cylinder is set to measure.

Figure 5:
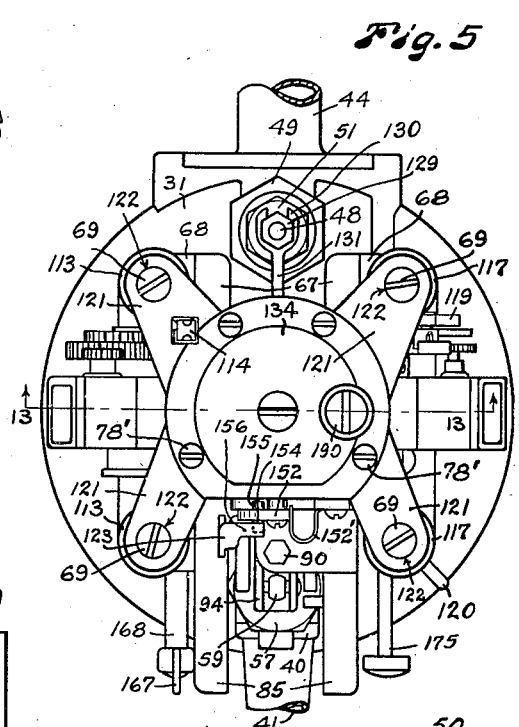
Fig. 5 is a top plan view of this beer dispensing device, the handle being removed and parts being broken away.
Figure 7:
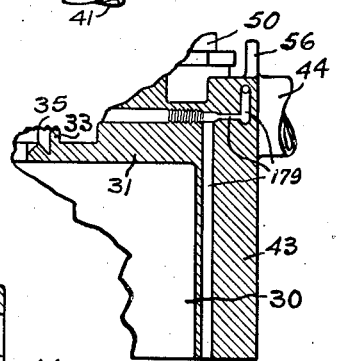
Fig. 7 is a fragmentary sectional view taken substantially on broken line 7—7 of Fig. 6, and showing parts of air relief devices.

The oil cylinder head 75, Figs. 1, 4, 5, 8, 11 and 13, is provided with four radial arms 121, Fig. 5, that extend outwardly therefrom and have holes 122 therein, see Fig. 5, to receive and be supported by the upper end portions of the hold down screws or posts 69. The main frame member 66 and the hold down screws or posts 69 and the oil cylinder head 75 thus cooperate to form a substantial frame structure above the cylinder 30 upon which operating parts of the device are mounted.

A fill pressure control toggle 123, shown detached in Figs. 28 and 29, is mounted for vertical movement in a guide slot 124 and a guide lug 125 positioned at the front of the main frame mounted for vertical movement in a guide slot 124 and a guide lug 125 positioned at the front of the main frame member 66, see Figs. 2, 3, 11 and 21. A bracket 126 is provided on the toggle member 123 for engagement with a rounded member 127 on the handle 86. A compression spring 128, see Fig. 11, is provided on the toggle member 123 between the bracket 126 and the frame lug 125 in which the lower end portion of said member 123 is guided. This compression spring 128, Figs. 4 and 11, yieldingly urges the member 123 upwardly and stop means may be provided for limiting the upward movement of this toggle. Cam 202 (Fig. 29) on this toggle 123 operates lever 204 (Fig. 2) which operates lever 204 and clutch mechanism 200, so that counter 82 only operates during one direction of travel of rack 114. In view of the fact that no claim is made for the counter mechanism, the same is not shown in detail.

The upper end portion of the stem 48 of the inlet control valve 47 is provided with a nut 129 under which is positioned the forked rear end portion 130 of a lever arm 131, see Figs. 3, 11, 12, 13, 14, 15 and 16. The lever arm 131 is curved, as shown in Figs. 12 and 16, so as to extend through a suitable passageway 132 in the main frame member 66, Fig. 12, and said lever is fulcrumed on a screw 133, shown by dotted lines in Fig. 12 and by full lines in Fig. 13. The forward end of the lever arm 131 is positioned between the frame brackets 85 alongside of the cross head 92—93—94, as shown in Fig. 12, and under the rounded member 127 on the end of handle 86. Downward movement of the forward end portion of this lever arm 131 will move the rear end portion of said lever arm upwardly and open the inlet control valve 47. When the handle 86 is moved clockwise from the position shown in Fig. 11, the inlet valve 47 will be opened and the clutch 200, between gearing 114' and registering means 82, is thrown out, thus preventing operation of counter 82 during this direction of movement. When the handle 86 is moved counterclockwise, the inlet valve 47 will be closed by spring 55 and the clutch 200, between gears 114' and registering means 82, thrown in, and thus the registering means 82 will operate during this direction of travel. If the lever 86 is moved far enough, the discharge control valve 58 will be opened.

When the inlet valve 47 is opened, by movement of the upper end portion of the handle 86 toward the oil cylinder 72, liquid, such as beer, under pressure will enter through inlet conduit 44 and valve seat opening 46 and will begin to force the main piston 96—97—98 down against the pressure of springs 118 and at the same time the oil piston 109 will begin to move downwardly in the oil cylinder 72 and will begin to force oil out of the lower part of said cylinder 72 and into the upper portion thereof, as hereinafter described. The beer is thus admitted into the main cylinder under a predetermined pressure and at a predetermined flow.

Positioned upon the oil cylinder head 75 is an oil reservoir 134 that is secured to the head 75 by screws 78'. Gaskets 134' are preferably provided between the oil cylinder head 75 and both the oil cylinder 72 and the oil reservoir 134.

A horizontal cylinder 135 is provided in the oil cylinder head 75 for the reception of a foam and fill control rotor or valve 141, see Figs. 11, 13, 14, 30, 31 and 32. This cylinder 135 has three ports 136, 137 and 138 on its lower side and one port 139 in its upper side. The ports 136 and 137 communicate with the upper end portion of the oil cylinder 72. The port 138 communicates with a passageway 140 in the wall of the cylinder 72. The passageway 140 extends to the lower end of the oil cylinder 72 and communicates with the bottom portion of said oil cylinder 72 below the piston 109. The upper port 139 communicates with the oil reservoir 134.

The rotor 141, Figs. 30, 31 and 32, has a longitudinally extending passageway 142 connected at one end with a radial port 143. Two other radial ports 144 and 145 extend from the passageway 142 to the exterior of the rotor 141 diametrically opposite from the port 143 and longitudinally offset therefrom. Two other radial ports 146 and 147 are provided in the walls of the rotor 141 diametrically opposite to each other and substantially at right angles to the ports 143, 144 and 145. The outer ends of the ports 146 and 147 terminate in an external annular groove 148 in the rotor. The port 144 terminates in a straight groove 149 which widens the mouth portion of said port 144 on the exterior of the rotor 141. The forward end portion 150 of the rotor 141 is of smaller diameter than the other portion to make room for packing 151 that is held in place by a suitable nut 157, Figs. 11 and 14. Preferably a square shank is provided on the forward end of the rotor 141 and a crank member 152 is secured on this shank by a screw 153. Two pins 154 and 155 extend sidewise from the crank 152 in opposite directions.

The fill pressure control toggle 123 has a pin-engaging member 156 on the upper end portion thereof. This pin-engaging member 156 is adapted to engage with the forwardly protruding pin 154 on the crank member 152 of the rotor 141. The lower edge of the pin engaging member 156 preferably has an inclined portion 158 positioned to engage with the pin 154 of the crank member 152. A lug member 159 of an exact shorter length than the member 156 is provided in spaced relation below the member 156. This lug member 159 disengages with pin 154 at an exact position of pin 154, so that lug 160 will engage pin 155 at exact position each time. The pin 155 of crank 152 is positioned for engagement by two spaced apart lugs 160 and 161 on the upper end portion of a bracket 162 that is integral with the cross head member 92—93—94. Lug member 161 disengages pin 155 at an exact position of pin 155 so that member 156 engages pin 154 at exact position each time. A detent spring 152', Figs. 4, 5 and 14, is positioned to bear against the crank 152 and tends to hold the rotor 141 in a neutral position exactly where members 159 and 161 disengage pins 154 and 155 respectively.

The amount of liquid delivered from the dispenser at each operation of the lever is regulated in two ways. One way is by rotating the piston rod 103 in the internally threaded shank 100 of the main piston member 96, which will adjust the rod 103 longitudinally of piston 96 and regulate the extent of downward travel of piston 96 and thereby regulates the volume of the measuring chamber between piston 96 and the head 31 for the full glass. At the same time such rotation of the piston rod 103 adjusts the volume adjusting member 106 in the internally threaded tubular boss 107 of the spring frame 110, which adjusts the volume of the five-cent glass. The rod 103 may be turned by inserting a tool with a non-cylindrical end portion into a socket 103' of non-cylindrical shape in the end portion of said piston rod 103, see dotted lines, Figs. 11 and 13. Obviously if the rod 103 is turned while the main piston is held non-rotatable, then the main piston 96—97—98 will be adjusted longitudinally of the rod 103, thereby adjusting the large size or ten-cent glass, and also the volume adjusting member 106 will be simultaneously adjusted longitudinally within the socket 107, thereby adjusting the small size or five-cent glass. By providing twice as many threads per inch within the socket 107 as on the rod 103, I provide for proportionately adjusting the volume of a small or five-cent glass and a large or a ten-cent glass of beer. Obviously other ratio of threads may be employed to provide a different ratio between a small glass and a large glass.

The other adjustment of a different type is an instantaneous adjustment made from the exterior of the dispenser to selectively provide for the delivery of either a small or five-cent glass or a large or ten-cent glass of beer upon operation of the lever 86.

To adapt the device for the latter adjustment, I provide on the internally threaded socket 107 that extends downwardly from the spring frame 110 the two downwardly protruding lugs 111, and further provide on the sides of said socket two recesses 163, see Figs. 6, 9, 10, 23, 24 and 25. These lugs 111 cooperate with an adjustable stop ring 164, Figs. 33 and 34, that is positioned on the cylinder head 31 and rotatively adjustable around the central tubular boss 33. The stop ring 164 has upwardly protruding lugs 165 adapted to be engaged by the lugs 111 of the spring frame for one position of the stop ring and has cut away portions 166 adjacent the lugs 165 adapted to provide clearance for the lugs 111 for another position of the stop ring.

The stop ring 164 is rotatively adjusted by a lever 167 on the exterior of the dispenser, see Figs. 4, 5 and 6, that is connected with a shaft 168 which is journaled in one of the bosses 32 of the cylinder head 31. The shaft 168 has a cam 169 on its inner end that is positioned for engagement with an upwardly protruding member 170 on a drag link 171. The stop ring 164 has a pin 172 that engages within a hole 173 in the drag link. When the lever 167 and parts connected therewith are in the position shown in Figs. 4, 6 and 10, the cut away portions 166 will be aligned with the lugs 111 of the spring frame and the spring frame will be free to move downwardly until stopped by engagement of the bottom side of piston 109 with the bottom of oil cylinder 72. When the lever 167 is turned to the left, Fig. 4, substantially a quarter turn, the stop ring 164 will be angularly moved clockwise from the position shown in Fig. 6 far enough to bring the lugs 165 into alignment with the lugs 111, thus providing for stopping the downward movement of the spring frame when the lugs 111 strike against the lugs 165.

A spring 174 on an air relief valve stem 175 is positioned to engage with a lug 176 on the periphery of the stop ring 164 and urges the stop ring counter-clockwise into the position shown in Fig. 6. When the lever 167 is turned to the left, Fig. 4, into a horizontal position, it will remain in the horizontal position until manually moved back to the vertical. The spring 174 moves the stop ring 164 and lever 167 back to the position shown in Figs. 4 and 6 and tends to hold them in that position.

The provision of the stop ring 164 and operating devices therefor makes it possible for the person operating the device to set the lever 167 in an upright position for drawing a large size or ten-cent glass of beer by allowing the main piston and spring frame to be moved down a maximum amount or to turn the lever 167 horizontally and set these parts so that the lugs 111 of the spring frame will strike against and be stopped by the lugs 165 of the stop ring 164 to stop the main piston and spring frame before they have been moved too far down for drawing a smaller or five-cent glass of beer.

The valve stem 175 is part of an air relief means for relieving air in the inlet conduit chiefly in starting the operation of the dispenser after it has been disconnected from the source of supply of liquid. This valve stem, see Figs. 6 and 7, has a portion 177 threaded into one of the frame bosses 32 and is provided with a tapered valve point 178 for selectively opening or closing an air relief passageway 179 that communicates between the atmosphere, preferably at the bottom of the cylinder 30, and the upper portion of the inlet conduit 44. After the device has been connected with a fresh keg of beer this valve may be opened to relieve trapped air and may be closed as soon as beer begins to flow from the relief passageway 179.

The operation of the foam and fill control mechanism is as follows:

When the parts are in the neutral position, which they will occupy at all times except when liquid is being drawn off, the main piston member 96 will be held tightly against the cylinder head 31 by the force of the springs 118 which tend to elevate the spring frame means and act through volume adjusting disc 106 and piston rod 103 to exert an upward pull on the piston 96. Also the operating lever 86 will be in the neutral position shown in Fig. 11, with valves 47 and 58 both closed.

It is to be noted that in Figs. 1, 4, 8, 11 and 13 herein the main piston member 96 is threaded onto the shank 100 as far it will go. This would provide an adjustment for the delivery of the minimum amount of liquid within the capacity of the device at each operation and an adjustment of the piston member 96 further downward on the shank 100 would ordinarily be used.

When the operating lever 86 is in the neutral position the foam and fill control rotor 141 will be turned so that all ports communicating with the oil cylinder 72 will be closed, it being noted that there is always communication through port means 146—147—148 with the oil reservoir 134. If the handle 86 is moved from the neutral position toward the oil reservoir 134 as far as it will go or until the rounded lower end portion 127 of said handle encounters stop members 180 on the cross head 92—93—94, the end portion 127 of the handle 86 will depress the forward end of the inlet control lever 131 but first will move fill pressure control toggle 123 downwardly and through cam 202 will operate clutch 200 and disengage the registering mechanism 82.

Depressing the forward end portion of lever 131 will raise the rear end portion thereof and open the inlet valve 47. At the same time the depression of the fill pressure control toggle 123 will cause the pin engaging member 156 thereof to engage with the pin 154 of crank member 152 and turn the foam and fill control rotor 141 through an angle of substantially ninety degrees. This will bring the port 143 of said rotor 141 into registration with the port 136 of the rotor cylinder 135, thus allowing oil to flow from below the piston 109 through passageway 186, under valve plunger 188 and into oil reservoir 134 and at the same time allowing oil to flow through ports 146 and 143 and 136 into the upper end portion of the oil cylinder. The speed at which the main piston 96 can move downwardly, is thus regulated by the relief of oil from below the piston head 109 through passageway 186 and past and by raising valve 188 against pressure of spring 189.

When the main piston 96 has moved downwardly until the lugs 111 on the spring frame member strike against the lugs 165 on the stop ring 164, or the lower part of the oil piston 109 strikes against the bottom of the oil cylinder 72, depending on whether the stop ring 164 is set for delivery of a five cent glass or a ten cent glass of beer, then downward movement of the main piston 96—97—98 will be stopped.

When the handle 86 is moved in a reverse direction, counterclockwise as respects the showing in Fig. 1 or is moved downwardly to the neutral position, the rounded portion 127 of the handle 86 will have been raised, thus permitting angular movement of the lever 131 and permitting spring 55 to close the inlet valve 47. During the movement of the rounded end portion 127, which closes the inlet valve 47, the spring 128 raises the fill pressure control toggle 123, causing the lug 159 thereof to move the pin 154 of the rotor 141 upwardly and rotatively move the rotor 141 so that all parts communicating with the oil cylinder 72 are closed, thus preventing any upward movement of the main piston 96—97—98. Thus, in the neutral position after the measuring chamber has been filled both the inlet valve 47 and the outlet valve 58 are closed and the piston 96—97—98 is held immovable because of the position of the foam and fill control rotor 141.

Further counterclockwise movement of the lever or handle 86 from the neutral position permits spring 128 to move the fill pressure control toggle 123 further upwardly and the cam 202 on said toggle 123 disengages the clutch lever 204, thus letting in clutch 200 and permitting gears 114 to engage with the registering mechanism 82. Thus the registering mechanism 82 will operate only during the upward movement of the main piston 96—97—98 and register the number of fluid ounces of beer dispensed.

Further counterclockwise movement of the lever or handle 86 will cause the end 127 thereof to begin to lift the cross head 92—93—94 and this will begin to lift the discharge valve 58. This discharge valve 58 must move a substantial distance before it begins to uncover the opening to the discharge spout 41. Thus the first movement of the discharge valve 58 functions to increase the capacity of the measuring cylinder and permits the pressure to be relieved and the beer to be expanded in the enlarged measuring chamber. During this period of enlarging the measuring chamber and release of pressure, the main piston 96—97—98 is held immovable, because of the position of rotor 141, and the beer is permitted to expand in a static state and without agitation of the beer.

As soon as valve 58 completely uncovers the outlet passageway to spout 41, valve 50 closes port 64 into passageway 65 so that spout 41 communicates with the atmosphere only through its discharging spout and thus provides for the desired character of flow of beer during the discharging operation. During the downward movement of handle 86 from its neutral position and until the outlet valve 58 has moved into engagement with the spring retainer 62, the fill pressure control toggle 123 will have moved further upwardly by reason of the pressure from spring 128 and will have accomplished the following: The lug 159 has been engaging pin 154 and angularly moving the rotor 141. The lug 159 has finally moved past the pin 154, leaving rotor 141 in a neutral position.

During this same movement of the handle 86 the cross head 92—93—94 has been moving upwardly and the lug 160 has engaged pin 155 at a position just after the lug 159 has released the pin 154. This upward movement of the cross head during this period of movement of the handle 86 has permitted the lug 160 to move the pin 155 and in turn rotatively move the rotor 141 so that when the valve 58 engages with the spring retainer 62 the port 144 is just about ready to communicate with the port 137 in the control rotor cylinder 135 and the port 145 of the rotor 141 has communicatively connected with port 138 of oil rotor cylinder 135. Further downward movement of the handle 86 and in turn rotary movement of the foam and fill control rotor 141 after the valve 58 is resisted by the spring 61 will thus serve to regulate the rate of the discharge of oil between the top and bottom of the oil cylinder 72 and in turn regulate the rate of discharge of beer from the measuring chamber.

The operator may regulate the rate of discharge of the beer by the extent of depression of the handle 86 which will control the rate of flow of oil from the upper to the lower part of the oil cylinder 72. Also the maximum extent of further depression of the handle 86 and in turn regulation of said rate of discharge of oil may be regulated by an adjustable stop which is here shown as an adjusting screw 90 which will limit the upward movement of the cross head 92—93—94.

While discharging the beer at the desired rate to provide the desired extent of foam, the main piston 96—97—98 has moved upwardly until the piston 96 contacts the head 31. Then upon reversing the movement of lever 86, i. e., moving it upward to a neutral position, valve 58 starts downwardly and port 64 is opened, thus admitting atmospheric pressure and air into the passageway 65 and outlet spout 41, thus enabling all liquid trapped in the outlet spout 41 to drain out and completely discharge the spout 41 upon each operation.

Also when the lever 86 was moved to a neutral position, the outlet valve 58 was moved downwardly by reason of spring 60 and any beer remaining in the crevices about piston 96—97 and head 31 and in the lower portion of the discharge valve cylinder 38 is compressed and placed under pressure by action of the outlet valve 58.

Preferably the lever member 86 is provided with a detent member 181, Fig. 11, yieldingly supported by a spring 182 and adapted to drop into countersunk depressions 183 in the frame, shown dotted in Figs. 20 and 21, to yieldingly hold the lever member 86 in the neutral position or in a raised position.

A suitable vented removable plug 184 is provided in the oil reservoir 134 to facilitate introduction of oil and prevent a vacuum in the oil reservoir.

During normal operation, the inlet valve 47 must be first closed before the outlet valve 58 may be opened. For facilitating cleaning, a cleaning lock, Fig. 3, is provided for locking the lever 131 and in turn locking the inlet valve 47 open during cleaning of the dispenser. This cleaning lock comprises a button member 191 longitudinally movable in a socket 192 and urged outwardly by a spring 193. A locking bar 194 is secured on the button member 191 and adapted to be moved into engagement with the upper forward end portion of lever arm 131 to lock the same in a depressed position, which position holds the inlet valve 47 off of its seat 46, thus allowing the cleaning fluid, which is forced into chamber 30 through outlet 41, to pass out through 45 in a direction opposite to the normal direction of the beer flow, thus cleaning all beer passages.

The force of inlet valve spring 55 exerted through lever 131 on the under side of locking bar 194 creates friction sufficient to overcome the urge of cleaning lock spring 193 to disengage locking bar 194 from lever 131. When handle lever 86 is again raised to its uppermost position, lever 131 is depressed to a lower position than that in which it has been held by locking bar 194, and spring 193 forces locking bar out of engaged position with lever 131, thus permitting lever 131 to move upwards and downwards normally with the movement of handle lever 86.

The rack bar 114, which is fixed to spring guide member 113, is connected by gearing 114' with suitable registering mechanism 82 shown in Figs. 2, 4, 5, 8, 13 and 14 for registering the total volume of beer dispensed. As this registering means 82 is of well known form and is not herein claimed it is not described in detail. The gearing 114' is shown somewhat diagrammatically in Fig. 8 and in section in Fig. 2, which also shows clutch mechanism 200 for disengaging gearing 114' from the registering means 82 during filling movement of the beer piston, as it is desired to register only discharging movement of the beer piston.

The clutch 200 engages the gearing 114' with the register 82 during discharging movement and disengages the gearing 114' from the register 82 during filling movement. Clutch operating cam 202 (Fig. 29) on the side of fill pressure control toggle 123 operates clutch mechanism 200 (Fig. 2). Fill pressure control toggle 123 is actuated by movement of rounded end 127 of the lever 86 engaging bracket 126 on the downward stroke of said 127, which moves cam 202 downwardly engaging clutch lever 204 which in turn operates clutch 200 and disengages gearing 114' from registering mechanism 82. Upward movement of said end 127 engages the registering mechanism 82.

The cam 119 operates the tally 79 through suitable lever and ratchet mechanism, indicated generally by 119' in Fig. 8. This tally mechanism is also of well known form and is not herein described in detail, except that the form of cam 119 enables it to tally one-half count when a five-cent glass is drawn and full count when a ten-cent glass is drawn.

A removable housing 195 (Fig. 18) having a fixed portion 196 in the front portion thereof is provided for enclosing this beer dispenser. This housing is shown detached in Fig. 18 and a fragment of the same is shown in Figs. 11 and 13 but it is omitted from all of the other views. This housing fits over the upper part of base portion 30 and a screw 200', Fig. 11, secures fixed portion 196 to the member 40. A hand wheel 197 is rotatively mounted in the upper portion of this housing. A spring member 198 engages this hand wheel to hold it in any position in which it is set. A socket 199 in the hand wheel 197 is adapted to fit over the head of the maximum foam control screw 90 so that the same may be adjusted by the turning of the hand wheel 197. Maximum foam control screw 90 is fitted in threads 89 formed in fixed boss 88 of main frame and oil cylinder member 66 shown apart in Figs. 20 and 21 and in Figs. 1, 4, 5, 11 and 14 in elevation, plan and section. The upper end of the maximum foam control screw 90 is formed to loosely fit non-rotatively into socket 199 of hand wheel 197. The purpose of this screw 90 is to adjustably restrict the maximum upward movement of the operating cross head member shown detached in Figs. 35 and 36. The lower end of the maximum foam control screw 90 engages the upper face of lug 93 of the operating crosshead, thus stopping upward movement which in turn stops rotative movement through 160, 155, 152 and 150 of foam control rotor 141 shown in Figs. 30, 31, and 32. Screw 90 serves as an adjustable vertical stop, thus controlling the degree of rotation of foam control rotor 141.

By way of summary the mode of operation of my device may be, in general, described as follows:

Beer from a keg (not shown) is delivered at the desired temperature and under pressure to the conduit 44. The pressure on the beer in the keg is obtained by any usual means, such as a regulated air compressor or bottles of carbon dioxide gas. Also the beer is cooled by passing the beer through a conduit positioned in a refrigerating medium, as cracked ice or a mechanically refrigerated bath, all of which is prior art practice and therefore not illustrated. The pressure desired for use in this invention is a pressure greater than the maximum pressure necessary under conditions where the device may be used to maintain the carbon dioxide within the beer. The beer in the inlet valve chamber 45 is thus under a sufficient pressure so that the beer will not foam. Assuming a position in the cycle of operation where a glass of beer has been previously discharged from the device, a small amount of beer will be present between the piston member 96 and the head 31. Also some beer will be present between the cup ring 97 and piston 96 and head 31. However, beer that was previously left in the discharge valve cylinder 38 and below the discharge valve piston 58 will be compressed by the spring 60, urging the discharge valve piston 58 downwardly. Thus beer is present under pressure contacting all surfaces of the inlet valve 47. When the inlet valve 47 is raised by operation of a hand lever 86 there will be no "wire drawing" of beer about the valve 47, causing foam. It is important to note that in this invention I provide means whereby the inlet valve 47 may be lifted from its seat without causing change of pressure or agitation of the beer, thus preventing foaming.

Next the valve 47 is completely opened before any movement in the beer occurs. This is accomplished as the pressure of the beer which is exerted against the piston 96 is transmitted by the piston rod 103 to the piston 109 of the fluid pressure control means. This tends to urge the piston 109 downwardly, which movement is resisted by the fluid or oil present in the oil cylinder below the piston 109. Referring to Fig. 13, the oil below the piston 109 is in communication with the passageway 186 and is urged against valve 188. The valve 188 is spring loaded and adjustable so that it may not be opened until a desired fluid predetermined pressure is created thereagainst. This means that after the inlet valve 47 has been completely opened, there will be no movement of the piston 96 until sufficient force is exerted against 96 to unseat the valve 188 in the fluid pressure control means. Thus there will be maintained a sufficient pressure at all times to prevent foaming of the beer. After the valve 188 has been unseated, the fluid will flow past the valve 188 and into the reservoir 134, and thence through ports in the rotor 141 into the oil cylinder 72 above piston 109. Thus the rate of downward travel of the piston 96 is determined by the pressure of spring 189, acting to restrict the passageway 186. By controlling the downward travel of the piston in response to predetermined pressures exerted on the piston, I am able to have the measuring chamber filled and without foam on the beer. In this connection it will be helpful to keep in mind that the release of carbon dioxide from within the beer may be well likened to the boiling point of a liquid, and for each temperature there is a critical pressure which is sufficient at that temperature to retain the carbon dioxide content within the beer. The release of the carbon dioxide content from within the beer causes the foaming conditions. Likewise it should be kept in mind that the beer has been refrigerated before entering the inlet conduit 44 and to a temperature found most desirable for serving beer which will vary only through a small range. By various links and levers previously explained when the handle 86 is urged upwardly, the inlet valve 47 will be opened to accomplish the results which have just been described. At this time the spring 60 will have urged the outlet valve 58 into closed position. However, should the outlet valve 58 for any reason fail to have gone down by said spring 60, the movement of the handle 86 upwardly will, through the various linkages described, urge said outlet valve 58 closed.

After the piston 96 has been urged downwardly by the incoming beer and while the beer has been maintained under a sufficient pressure to prevent foaming, the travel of the piston will continue until the piston 109 engages the lower part of oil cylinder 72. This position will be audibly indicated by the metallic sound emanating by reason of contact between the metal piston 109 and the bottom of the oil cylinder 72 and will be visibly indicated as the lug 120 (Fig. 4) will be in registration with the number at the lower part of the scale 201 (Fig. 18) to which the volume to be measured in the device has been set.

At this point the operator moves the lever 86 in a downward direction and through links and levers, the downward movement of the handle 86 serves to first seat the inlet valve 47. This is accomplished by the time the handle 86 moves to the neutral position, which is shown in Fig. 11. It is to be noted that any pressure on the upper side of inlet valve 47, as in the inlet valve chamber 45, cooperates with the spring 55 in positively seating the valve 47 on its seat.

Further downward movement of the handle 86 from the neutral position shown in Fig. 11 serves first to throw in the clutch mechanism 200 so that the register or counter 82 for counting the ounces dispensed will operate only during the ensuing upward movement of the piston 96. The downward movement of the handle 86, operating through the various links and levers previously described, serves to move the piston like discharge valve member 58 upwardly. I have found it practical in my invention to combine a valve outlet member with a means for increasing the volume of the metering reservoir. It is to be distinctly understood that by providing a member having both functions I am not to be limited to any such specific construction. As the beed in the measuring chamber between the piston 96 and the head 31 is under pressure, as both the inlet valve 47 and the outlet valve 58 are closed, the beer may not be directly dispensed or else undesirable foaming would occur due to the spurt incident to the dispensing of beer under such pressure by a direct opening valve. To eliminate any such tendency I relieve the pressure by moving the piston valve 58 upwardly, which thus allows the beer while static to expand and relieve the pressure all before the valve 58 raises sufficiently in height to provide an opening discharge port to the spout 41. It must be kept in mind that beer may be compressed and will expand upon the release of pressure, due to the change in size of the bubbles of the carbon dioxide included therein. Foaming of beer is brought about by reason of friction between the beer and external surfaces, as distinguished from movement within the beer itself, when the pressure is insufficient to retain the carbon dioxide within the beer. As the beer was under pressure before movement of the piston valve 58, this pressure was relieved as the piston valve 58 moved upwardly in the discharge valve cylinder 38. No movement of the piston 96 occurs during the expansion period and the beer is static due to the fact that the piston 96 is connected with the piston rod 103 and piston 109. The fluid above the piston 109 will prevent upward movement of said piston 109 and in turn the piston 96 unless fluid is permitted to pass from oil cylinder 72 into oil reservoir 134. The only way that such fluid can pass between such parts is through the foam and fill control rotor 141. Unless the handle 86 moves sufficiently downwardly to compress the spring 61, the ports of said foam and fill control rotor 141 will be in such position that the piston 109 cannot move upwardly. Thereafter upon further depression of the handle 86, either by hand control of the extent of compression of spring 61, or until the lug 93 engages the adjustable stop 90, the rate of upward movement of the piston 96 and in turn the discharge of beer will be controlled. In other words, if more foam is desired, it is only necessary to discharge the beer at a faster rate, or if less foam is desired, it is only necessary to provide for the discharge of the beer at a slow rate as the impact of the beer in a glass will cause foam.

After the piston 96 has moved upwardly into the position shown in Fig. 11 where it rests against the head 31, the handle 86 is moved upwardly to a neutral position. This will uncover the port 64 in the discharge valve cylinder 38 to permit complete drainage of the contents of the spout 41, which contents were held therein by atmospheric pressure. As the piston valve 58 moves downwardly by reason of the spring 60, it will serve to compress any beer remaining in the discharge valve cylinder 38 so that whatever openings are present between the piston 96 and head 31 will be filled with beer under pressure and beer will be under pressure adjacent the underside of the inlet valve 47, thus completing a cycle of operation.

Throughout the operation of my device I thus provide apparatus where the beer at the temperatures obtaining may be handled under sufficient pressure to maintain the carbon dioxide content therein until after the beer has been measured. Thereafter I provide means to release the pressure on the then static beer trapped within the measuring cylinder by increasing the volume of the confining chamber. Then the confining chamber is open to the atmospheric and the beer is lifted out through a discharge port and at an adjustable predetermined rate of flow.

Obviously, changes may be made in the forms, dimensions and arrangement of the parts of my invention, without departing from the principle thereof, the above setting forth only preferred forms of embodiment.

I claim:

1. A device of the class described comprising cylinder means; a piston mounted for traveling movement in said cylinder forming with said cylinder an expansible and contractable chamber; conduit means connecting a source of effervescent and gas charged liquid under pressure; with said expansible and contractable chamber; inlet valve means between said conduit means and said chamber; outlet valve means for said chamber; beer delivery spout means connected with said outlet valve means; air vent valve means in the upper portion of said spout means; and operating lever means operatively connected with said inlet valve means, said outlet valve means, and air vent valve means.

2. A device of the class described comprising cylinder walls and head means; a piston mounted for travelling movement in said cylinder forming with said cylinder an expansible and contractable chamber; conduit means connecting a source of effervescent and gas charged liquid under pressure with said chamber; inlet valve means between said conduit means and said chamber; outlet valve means for said chamber; shaft means threadedly connected with said piston; adjustable stop means carried by and threadedly connected with said shaft, whereby simultaneous adjustment obtains of the longitudinal position of the piston relative to the shaft and of the stop means relative to the shaft.

3. A device of the class described comprising cylinder head and wall means; a piston mounted for traveling movement in said cylinder forming with said cylinder an expansible and contractable chamber; conduit means connecting a source of effervescent and gas charged liquid under pressure with said expansible and contractable chamber; inlet valve means between said conduit means and said chamber; outlet valve means for said chamber; shaft means mounted for movement with said piston; a plurality of symmetrically positioned projecting stop members carried by said shaft; a fixed stop member having symmetrically positioned projecting stop members positioned intermediate the path of travel and movable into and out of the path of travel of the projecting stop members carried by said shaft; and a second fixed stop member engageable with and determining the maximum travel of the projecting stop members carried by said shaft.

4. A device of the class described comprising an upright cylinder forming means having an upper end and side walls; a piston mounted in said cylinder for traveling movement toward and away from said upper end wall and forming with said cylinder an expansible and contractable main chamber; conduit means connecting a source of effervescent and gas charged liquid under pressure with said main chamber to permit said liquid under pressure to move said piston away from said end wall and expand the main chamber; piston control and operating means resisting movement of said piston on its chamber expanding stroke and providing controlled movement to said piston on its chamber contracting stroke; inlet valve means connecting and disconnecting said conduit means from said main chamber; an expansible and contractable auxiliary chamber connecting with the upper portion of said main chamber and above the liquid level therein; means expanding and contracting said auxiliary chamber, whereby upon expansion of said auxiliary chamber the main chamber is expanded in capacity, the pressure of liquid therein is reduced and the liquid therein is expanded without agitation; and valve controlled outlet dispensing means for delivering liquids to containers in atmospheric conditions and connected with said main chamber, whereby liquid is expanded in said main chamber without agitation thereof upon expansion of said auxiliary chamber, is vented to the atmosphere upon opening of said valve controlled outlet dispensing means, and then such liquid is lifted upwardly by the piston on its chamber contracting stroke and discharged.

5. A device of the class described comprising an upright cylinder forming means having an upper end and side walls; a piston mounted in said cylinder for traveling movement toward and away from said upper end wall and forming with said cylinder an expansible and contractable main chamber; conduit means connecting a source of effervescent and gas charged liquid under pressure with said main chamber to permit said liquid under pressure to move said piston away from said end wall and expand the main chamber; piston control and operating means resisting movement of said piston on its chamber expanding stroke and providing controlled movement to said piston on its chamber contracting stroke; inlet valve means connecting and disconnecting said conduit means from said main chamber; outlet dispensing means for delivering liquids to containers in atmospheric conditions; upright auxiliary chamber means connecting at the lower portion with the upper portion of said main chamber and above the liquid level therein and connected at the upper portion with said outlet dispensing means; and traveling piston valve means in said auxiliary chamber mounted for traveling movement toward and away from the main chamber and into closing and opening positions as respects said outlet dispensing means, said piston valve means being movable a substantial distance in said auxiliary chamber means while in closing position as respects said outlet dispensing means, whereby upon upward movement of said piston valve means the main chamber is expanded in capacity, the pressure of liquid therein is reduced, the liquid therein is expanded without agitation, the liquid is vented to the atmosphere through said outlet dispensing means, and then such liquid is lifted upwardly by the piston on its chamber contracting stroke.

6. A device of the class described comprising an upright cylinder forming means having an upper end and side walls; a piston mounted in said cylinder for traveling movement toward and away from said upper end wall and forming with said cylinder an expansible and contractable main chamber; conduit means connecting a source of effervescent and gas charged liquid under pressure with said main chamber to permit said liquid under pressure to move said piston away from said end wall and expand the main chamber; piston control and operating means resisting movement of said piston on its chamber expanding stroke and providing controlled movement to said piston on its chamber contracting stroke; inlet valve means connecting and disconnecting said conduit means from said main chamber; lever operated regulating means determining the rate of travel of said piston on its chamber contracting and liquid dispensing stroke thereby also functioning as a foam control; an expansible and contractable auxiliary chamber connecting with the upper portion of said main chamber and above the liquid level therein; means expanding and contracting said auxiliary chamber, whereby upon expansion of said auxiliary chamber the main chamber is expanded in capacity, the pressure of liquid therein is reduced and the liquid therein is expanded without agitation; valve controlled outlet dispensing means for delivering liquids to containers in atmospheric conditions and connected with said main chamber, and a lever connected with said regulating means, said means expanding and contracting said auxiliary chamber, and said valve controlled dispensing means, whereby liquid is expanded in said main chamber without agitation thereof upon expansion of said auxiliary chamber, is vented to the atmosphere upon opening of said valve controlled outlet dispensing means, and then such liquid is lifted upwardly by the piston on its chamber contracting stroke and discharged with control of dispensing and foam control from a single lever.

7. A device of the class described comprising an upright cylinder forming means having an upper end and side walls; a piston mounted in said cylinder for traveling movement toward and away from said upper end wall and forming with said cylinder an expansible and contractable main chamber; conduit means connecting a source of effervescent and gas charged liquid under pressure with said main chamber to permit said liquid under pressure to move said piston away from said end wall and expand the main chamber; piston control and operating hydraulic means resisting movement of said piston on its chamber expanding stroke and providing controlled movement to said piston on its chamber contracting stroke; lever operated expansible and contractable aperture means determining the rate of flow of the liquid in the piston operating hydraulic means and in turn the rate of travel of said piston on its chamber contracting and liquid dispensing stroke thereby also functioning as a foam control; inlet valve means connecting and disconnecting said conduit means from said main chamber; an expansible and contractable auxiliary chamber connecting with the upper portion of said main chamber and above the liquid level therein; means expanding and contracting said auxiliary chamber, whereby upon expansion of said auxiliary chamber the main chamber is expanded in capacity, the pressure of liquid therein is reduced and the liquid therein is expanded without agitation; valve controlled outlet dispensing means for delivering liquids to containers in atmospheric conditions and connected with said main chamber; and a lever connected with said aperture means, said means expanding and contracting said auxiliary chamber, and said valve controlled dispensing means, whereby liquid is expanded in said main chamber without agitation thereof upon expansion of said auxiliary chamber, is vented to the atmosphere upon opening of said valve controlled outlet dispensing means and such liquid is lifted upwardly by the piston on its chamber contracting stroke and discharged with control of dispensing and foam control from a single lever.

8. A device for drawing and dispensing effervescent and gas charged liquids for relatively immediate use disposed in a container under pressure, comprising chamber forming members movable relatively toward and away from each other forming an expansible and contractable measuring chamber for receiving said liquid under pressure sufficient to retain the gases within the liquid; conduit means connecting a source of effervescent and gas charged liquid under pressure; inlet valve means connected with said conduit means and connecting and disconnecting said chamber from said source of effervescent and gas charged liquid under pressure; dispensing outlet means for dispensing a liquid under atmospheric conditions; outlet valve means connecting and disconnecting said chamber from said dispensing means; chamber expansion means connected with said chamber, whereby when said inlet and outlet valve means are closed, said chamber expansion means will enlarge said chamber and permit liquid at rest in said chamber to expand while sealed from the atmosphere; and means moving said chamber forming members toward each other and discharging liquids, without displacement of the liquid by air, from said chamber out of said dispensing means and into a suitable container when said outlet valve means are in open position.

9. A device for drawing and dispensing effervescent and gas charged liquids for relatively immediate use disposed in a container under pressure, comprising chamber forming member movable relatively toward and away from each other forming an expansible and contractable measuring chamber for receiving said liquid under pressure sufficient to retain the gases within the liquid; conduit means connecting a source of effervescent and gas charged liquid under pressure; inlet valve means connected with said conduit means and connecting and disconnecting said chamber from said source of effervescent and gas charged liquid under pressure; dispensing outlet means for dispensing a liquid under atmospheric conditions; outlet valve means connecting and disconnecting said chamber from said dispensing means; chamber expansion means connected to the upper portion of said chamber and above the liquid level therein, whereby when inlet and outlet valve means are closed, said chamber expansion means will enlarge said chamber and permit liquid at rest in said chamber to expand while sealed from the atmosphere; means moving said chamber forming members toward each other and discharging liquids, without displacement of the liquid by air, from said chamber out of said dispensing means and into a suitable container when said outlet valve means are in open position; and regulation means controlling the rate of movement of said chamber forming members relative to each other.

10. The method of drawing and dispensing effervescent and gas charged liquids for relatively immediate use from a container under pressure substantially above atmosphere comprising, delivering a predetermined amount of the said liquid into an expansible measuring chamber and at a pressure sufficient to retain the gases within the liquid; expanding the said chamber by the entry of said liquid into said chamber; sealing the chamber and the liquid therein from the container; enlarging the chamber above the liquid level therein while the chamber is sealed from the atmosphere and while the liquid is substantially at rest to reduce the pressure and permit expansion of the liquid; opening the measuring chamber to the atmosphere and providing atmospheric pressure therein; and dispensing said liquid at atmospheric pressure into a suitable container by contracting said chamber.

11. The method of drawing and dispensing effervescent and gas charged liquids for relatively immediate use from a container under pressure substantially above atmosphere comprising, delivering a predetermined amount of the said liquid into an expansible measuring chamber and substantially at a pressure sufficient to retain the gases within the liquid; expanding the said chamber by the said liquid; sealing the chamber and the liquid therein from the container; enlarging the chamber above the liquid level therein while the chamber is sealed from the atmosphere and while the liquid is substantially at rest to reduce the pressure and permit expansion of the liquid; opening the measuring chamber to the atmosphere and providing atmospheric pressure therein and dispensing said liquid at a regulated rate of discharge into a suitable container under atmospheric conditions by contracting said chamber.

12. The method of drawing and dispensing effervescent and gas charged liquids for relatively immediate use from a container wherein the liquid is under pressure comprising, delivering a predetermined quantity under pressure of such liquid into an expansible chamber and thereby expanding the same; sealing said chamber; enlarging the capacity of such chamber above the liquid level therein while said chamber is sealed and while the liquid therein is substantially at rest; venting such chamber to the atmosphere; and dispensing said liquid into a suitable container under atmospheric conditions by contracting said chamber.

13. A device of the class described comprising cylinder means; a piston mounted for traveling movement in said cylinder forming with said cylinder an expansible and contractable chamber; conduit means connecting a source of effervescent and gas charged liquid under pressure with said expansible and contractable chamber; inlet valve means normally assuming a closed position and disposed between said conduit means and said chamber; outlet valve means for said chamber; operating lever means; inlet valve control means positioned in the path of travel of said operating lever means for opening said inlet valve means; outlet valve control means connected with said operating lever means for moving said outlet valve means into and out of closed position; and locking means holding said inlet valve means in open position, whereby the inlet valve means may be held open and the outlet valve means opened simultaneously therewith for cleaning purposes.

RALPH S. WHALEY.